(12) United States Patent
Wang et al.

(10) Patent No.: US 11,179,924 B2
(45) Date of Patent: Nov. 23, 2021

(54) THERMOPLASTIC ROOFING MEMBRANES FOR FULLY-ADHERED ROOFING SYSTEMS

(71) Applicant: FIRESTONE BUILDING PRODUCTS CO., LLC, Indianapolis, IN (US)

(72) Inventors: Hao Wang, Carmel, IN (US); Donna Tippmann, Fishers, IN (US)

(73) Assignee: Firestone Building Products Company, LLC, Nashville, TN (US)

( * ) Notice: Subject to any disclaimer, the term of this patent is extended or adjusted under 35 U.S.C. 154(b) by 402 days.

(21) Appl. No.: 15/327,867

(22) PCT Filed: Jul. 23, 2015

(86) PCT No.: PCT/US2015/041707
§ 371 (c)(1),
(2) Date: Jan. 20, 2017

(87) PCT Pub. No.: WO2016/014776
PCT Pub. Date: Jan. 28, 2016

(65) Prior Publication Data
US 2017/0203555 A1    Jul. 20, 2017

Related U.S. Application Data

(60) Provisional application No. 62/028,010, filed on Jul. 23, 2014.

(51) Int. Cl.
*B32B 27/32* (2006.01)
*B32B 27/08* (2006.01)
(Continued)

(52) U.S. Cl.
CPC .............. *B32B 27/32* (2013.01); *B32B 5/024* (2013.01); *B32B 27/08* (2013.01); *B32B 27/12* (2013.01);
(Continued)

(58) Field of Classification Search
CPC ......... B32B 27/32; B32B 27/08; B32B 27/12; B32B 27/20; B32B 2264/108;
(Continued)

(56) References Cited

U.S. PATENT DOCUMENTS 4,141,187 A   2/1979  Graves
4,957,968 A   9/1990  Adur et al.
(Continued)

FOREIGN PATENT DOCUMENTS

CN   101668808 A   3/2010
EP    1245620 A2  10/2002
(Continued)

OTHER PUBLICATIONS

International Search Report and Written Opinion for Appl. No. PCT/US2015/041707 dated Sep. 8, 2015, p. 1-3.
(Continued)

*Primary Examiner* — Samir Shah
(74) *Attorney, Agent, or Firm* — Renner, Kenner; Arthur M. Reginelli

(57) ABSTRACT

A thermoplastic membrane including at least one layer including a thermoplastic polyolefin and a functionalized polyolefin copolymer.

5 Claims, 2 Drawing Sheets

(51) Int. Cl.

| | | |
|---|---|---|
| *B32B 27/12* | (2006.01) | |
| *B32B 27/20* | (2006.01) | |
| *E04D 5/06* | (2006.01) | |
| *E04D 5/10* | (2006.01) | |
| *C08L 53/00* | (2006.01) | |
| *C08K 3/26* | (2006.01) | |
| *C08L 23/10* | (2006.01) | |
| *B32B 5/02* | (2006.01) | |
| *C08L 51/06* | (2006.01) | |
| *C08L 23/16* | (2006.01) | |
| *C08L 23/08* | (2006.01) | |
| *C08L 23/14* | (2006.01) | |
| *E04D 11/02* | (2006.01) | |

(52) U.S. Cl.
CPC ............. *B32B 27/20* (2013.01); *C08K 3/26* (2013.01); *C08L 23/0815* (2013.01); *C08L 23/10* (2013.01); *C08L 23/14* (2013.01); *C08L 23/16* (2013.01); *C08L 51/06* (2013.01); *C08L 53/00* (2013.01); *E04D 5/06* (2013.01); *E04D 5/10* (2013.01); *B32B 2264/102* (2013.01); *B32B 2264/104* (2013.01); *B32B 2264/108* (2013.01); *B32B 2272/00* (2013.01); *B32B 2307/3065* (2013.01); *B32B 2307/536* (2013.01); *B32B 2307/546* (2013.01); *B32B 2419/06* (2013.01); *C08K 2003/265* (2013.01); *E04D 11/02* (2013.01)

(58) Field of Classification Search
CPC ...... B32B 2307/3065; B32B 2307/536; B32B 2307/546; B32B 2419/06; C08L 23/14; C08L 23/0815
See application file for complete search history.

(56) References Cited

U.S. PATENT DOCUMENTS

| | | | |
|---|---|---|---|
| 5,437,923 | A | 8/1995 | Kalkanoglu |
| 5,573,092 | A | 11/1996 | Gabilondo |
| 5,624,999 | A | 4/1997 | Lombardi et al. |
| 5,891,563 | A | 4/1999 | Letts |
| 6,044,604 | A | 4/2000 | Clayton et al. |
| 6,117,375 | A | 9/2000 | Garrett et al. |
| 6,414,070 | B1 | 7/2002 | Kausch et al. |
| 6,503,984 | B2 | 1/2003 | Johnson et al. |
| 6,544,909 | B1 | 4/2003 | Venkataswamy et al. |
| 6,656,982 | B2 | 12/2003 | Yasuda |
| 6,720,067 | B2 | 4/2004 | Takahashi et al. |
| 6,927,258 | B2 | 8/2005 | Datta et al. |
| 7,355,089 | B2 | 4/2008 | Chang et al. |
| 7,387,753 | B2 | 6/2008 | Tackett et al. |
| 7,579,397 | B2 | 8/2009 | Nelson |
| 7,612,120 | B2 | 11/2009 | Letts |
| 7,666,491 | B2 | 2/2010 | Yang |
| 7,741,397 | B2 | 6/2010 | Liang et al. |
| 7,838,568 | B2 | 11/2010 | Letts et al. |
| 7,882,671 | B2 | 2/2011 | Bruce et al. |
| 7,893,166 | B2 | 2/2011 | Shan et al. |
| 7,964,672 | B2 | 6/2011 | Ouhadi |
| 8,440,284 | B2 | 5/2013 | Kelly |
| 9,045,904 | B2 | 6/2015 | Hubbard et al. |
| 9,434,827 | B2 | 9/2016 | Frei et al. |
| 10,260,237 | B2 | 4/2019 | Hubbard et al. |
| 2002/0013379 | A1 | 1/2002 | Singh et al. |
| 2002/0049266 | A1 | 4/2002 | Yasuda |
| 2003/0032351 | A1 | 2/2003 | Horner |
| 2003/0082365 | A1 | 5/2003 | Geary et al. |
| 2003/0153656 | A1 | 8/2003 | Sjerps |
| 2003/0198813 | A1 | 10/2003 | Howell |
| 2004/0033741 | A1 | 2/2004 | Peng |
| 2004/0109983 | A1 | 6/2004 | Rotter et al. |
| 2004/0146681 | A1 | 7/2004 | Naipawer, III et al. |
| 2004/0198912 | A1 | 10/2004 | Dharmarajan et al. |
| 2004/0248751 | A1 | 12/2004 | Johnson et al. |
| 2005/0183365 | A1 | 8/2005 | Naipawer, III et al. |
| 2006/0046084 | A1* | 3/2006 | Yang ................ B32B 5/022 |
| | | | 428/500 |
| 2006/0127664 | A1 | 6/2006 | Geary et al. |
| 2006/0179749 | A1 | 8/2006 | Brandt et al. |
| 2006/0199930 | A1 | 9/2006 | Li Pi Shan et al. |
| 2007/0193167 | A1 | 8/2007 | Bruce et al. |
| 2007/0194482 | A1 | 8/2007 | Douglas et al. |
| 2008/0179574 | A1 | 7/2008 | Yang et al. |
| 2008/0206583 | A1 | 8/2008 | Phan et al. |
| 2009/0049802 | A1 | 2/2009 | Johnson et al. |
| 2009/0137168 | A1 | 5/2009 | Peng |
| 2009/0181216 | A1 | 7/2009 | Peng |
| 2009/0269565 | A1 | 10/2009 | Peng |
| 2009/0275690 | A1 | 11/2009 | Weaver et al. |
| 2010/0029827 | A1 | 2/2010 | Ansems et al. |
| 2010/0084158 | A1 | 4/2010 | Gau et al. |
| 2010/0197844 | A1 | 8/2010 | Yang et al. |
| 2011/0003094 | A1* | 1/2011 | Becker ............... C08F 210/06 |
| | | | 428/17 |
| 2011/0118404 | A1 | 5/2011 | Jung et al. |
| 2011/0139340 | A1 | 6/2011 | Naipawer, III et al. |
| 2012/0045623 | A1 | 2/2012 | Delaney |
| 2012/0167510 | A1 | 7/2012 | Brandt et al. |
| 2012/0244340 | A1 | 9/2012 | Peng |
| 2013/0036694 | A1 | 2/2013 | Brandt et al. |
| 2013/0164524 | A1 | 6/2013 | Letts et al. |
| 2014/0011008 | A1 | 1/2014 | Letts et al. |
| 2014/0127443 | A1 | 5/2014 | Zhou |
| 2014/0150960 | A1 | 6/2014 | Peng |
| 2014/0373467 | A1* | 12/2014 | Wang ................ C08K 3/04 |
| | | | 52/232 |
| 2015/0038629 | A1 | 2/2015 | Ultsch |
| 2015/0119515 | A1 | 4/2015 | Frei et al. |
| 2015/0152643 | A1 | 6/2015 | Hubbard |
| 2015/0174871 | A1 | 6/2015 | Sollmann |
| 2015/0314511 | A1 | 11/2015 | Stoiljkovic et al. |
| 2016/0024794 | A1 | 1/2016 | Jenkins et al. |
| 2016/0207283 | A1 | 7/2016 | Wang |
| 2016/0312470 | A1 | 10/2016 | Wang et al. |
| 2017/0044770 | A1 | 2/2017 | Hubbard et al. |
| 2018/0023301 | A1 | 1/2018 | Wang et al. |
| 2018/0094439 | A1 | 4/2018 | Wang et al. |
| 2018/0162109 | A1 | 6/2018 | Gopalan et al. |
| 2018/0162971 | A1 | 6/2018 | Chen et al. |

FOREIGN PATENT DOCUMENTS

| | | |
|---|---|---|
| EP | 1655331 A1 | 5/2006 |
| WO | 2001066627 A1 | 9/2001 |
| WO | 2001096110 A1 | 12/2001 |
| WO | 2003016168 A1 | 2/2003 |
| WO | 2007136761 A1 | 11/2007 |
| WO | 2013102208 A1 | 7/2013 |
| WO | WO2013102208 * | 7/2013 |
| WO | 2014001224 A1 | 1/2014 |
| WO | 2014008501 A1 | 1/2014 |
| WO | 2014078760 A1 | 5/2014 |
| WO | 2014105809 A1 | 7/2014 |
| WO | 2015/089359 A1 | 6/2015 |
| WO | 2015089384 A1 | 6/2015 |
| WO | 2015164852 A1 | 10/2015 |

OTHER PUBLICATIONS

International Search Report and Written Opinion for Appl. No. PCT/US2014/069988 dated Mar. 5, 2015 (4 pp.).
ASTM D 6878-03 standard, 2003 (3 pp.) (Year: 2003).
International Search Report and Written Opinion for Appl. No. PCT/US2016/016975 dated Apr. 26, 2016.
International Search Report and Written Opinion forAppl. No. PCT/US2015/027698 dated Jul. 30, 2015 (10 pp).
International Search Report and Written Opinion for AppL No. PCT/US2015/041707 dated Sep. 8, 2015 (3 pp.).

(56) References Cited

OTHER PUBLICATIONS

International Search Report and Written Opinion for Appl. No. PCT/US2016/069073 dated Apr. 3, 2017, pp. 1-10.
International Search Report and Written Opinion for Appl. No. PCT/US2016/016960 dated Apr. 26, 2016.
Thermal Tech Equipment. Shore Durometer Conversion Chart, Jun. 13, 2003.
European Office Action dated Jul. 14, 2020 for corresponding EP Application No. 15750860.7 (4 pp.).

* cited by examiner

THERMOPLASTIC ROOFING MEMBRANES FOR FULLY-ADHERED ROOFING SYSTEMS This application is a National-Stage application of PCT/US2015/041707 filed on Jul. 23, 2015, which claims the benefit of U.S. Provisional Application Ser. No. 62/028,010 filed on Jul. 23, 2014 and are incorporated herein by reference.

FIELD OF THE INVENTION

Embodiments of the present invention provide thermoplastic roofing membranes that are useful for fully-adhered roofing systems; the overall membranes are characterized by an advantageously low flexural modulus.

BACKGROUND OF THE INVENTION

Thermoplastic roofing membranes, especially those membranes engineered to cover flat or low-sloped roofs, are known in the art. In fact, many of these membranes are engineered to meet the industry standards defined in ASTM D 790. Among the performance requirements provided in this industry standard, thermoplastic roofing membranes must meet threshold requirements for tensile strength and tear strength. Tensile strength is an indicator of seam strength, and the seam strength must withstand wind uplift forces. Tear strength is primarily important from the standpoint of fastener pull through. That is, where the membrane is mechanically attached to the roof surface, the membrane must be able to withstand threshold wind uplift forces without tear at the location of the fastener.

Many commercially-available thermoplastic roofing membranes include fabric-reinforced thermoplastic sheets. These membranes are fabricated by sandwiching a reinforcing fabric between two extruded thermoplastic sheets to provide a laminated structure. The thermoplastic extruded sheets, which can be the same or different, often include ethylene-propylene reactor copolymers (e.g. CA10A available from Lyondellbasell), together with various additives, such as inert filler, anti-weathering additives, and flame retardants. As the skilled person appreciates, the type and amount of additives employed, such as the filler, can impact the mechanical properties of the membrane including tensile and tear strength.

While industry standards for thermoplastic roofing membranes are designed with an eye toward mechanically-attached thermoplastic roofing systems, fully-adhered systems also exist. In fact, fully-adhered systems are often viewed as superior roof systems. As the skilled person appreciates, a fully-adhered system is installed by using an adhesive that attaches the membrane to the roof surface, where the adhesive substantially contacts all of the membrane surface adjacent to the roof deck. In practice, liquid bond adhesives or pressure-sensitive adhesives that are factory applied to the membrane are often used.

A problem encountered when installing fully-adhered thermoplastic roofing sheets relates to the stiffness of the roofing sheet. As the skilled person appreciates, the integrity of a fully-adhered system can hinge on the degree to which the overall surface of the membrane is adhered. Where areas or pockets exist that are not adhered, the system can fail wind uplift tests. This is particularly true where the membrane is not fully adhered over uneven surfaces in the roof, such as fastening plates that are often used to secure underlying insulation boards. The skilled person understands that the stiffness of the sheet creates problems when attempting to evenly apply the sheet over the roof surface, especially uneven substrates. A goal often sought is the ability to view the underlying contours of the roof surface though the membrane, which is indicative of complete adhesion to the roof. Where the membrane is too stiff, the membrane will not contour to the underlying surface. A term often used in the art is telegraphing, which refers to the ability of the sheet to contour to the substrate and thereby allow the presence of the substrate to be noticed with the sheet in place.

SUMMARY OF THE INVENTION

One or more embodiments of the present invention provide a thermoplastic membrane comprising at least one layer including a thermoplastic polyolefin and a functionalized polyolefin copolymer.

Still other embodiments of the present invention provide a multi-layered thermoplastic membrane comprising a first layer including a thermoplastic polyolefin and magnesium hydroxide and a second layer including a thermoplastic polyolefin, calcium carbonate or clay, and a functionalized polyolefin copolymer.

Still other embodiments of the present invention provide a roof system comprising a roof substrate and a membrane including at least one layer including a thermoplastic polyolefin and a functionalized polyolefin copolymer, where the membrane is fully adhered to the roof substrate

DETAILED DESCRIPTION OF ILLUSTRATIVE EMBODIMENTS

Embodiments of the present invention are based, at least in part, on the discovery of thermoplastic roofing membranes that can advantageously be used for fully-adhered roofing systems. These membranes are characterized by a relatively low stiffness, which allows the membranes to be installed using fully-adhered attachment techniques while overcoming installation problems associated with stiffness. In one or more embodiments, at least one layer of the membranes of the present invention includes a functionalized polyolefin copolymer. While the relatively low stiffness (as may be indicated by flexural modulus) carries with it a corresponding loss in certain mechanical properties, it has unexpectedly been discovered that the overall balance of properties is sufficient to provide technologically useful fully-adhered systems. For example, while low flexural modulus may be associated with a corresponding loss in fastener pull-through strength or resistance, the fact that the membrane systems are fully adhered diminishes the deleterious impact caused by this loss in property. Moreover, it has been advantageously discovered that the flexibility of the membrane can be maintained at relatively high filler loadings to provide membranes that are useful for constructing fully-adhered roofing systems. Accordingly, embodiments of the invention are directed toward fully-adhered roof systems that include membranes having relatively low stiffness as described herein.

Membrane Construction

Figure 1:
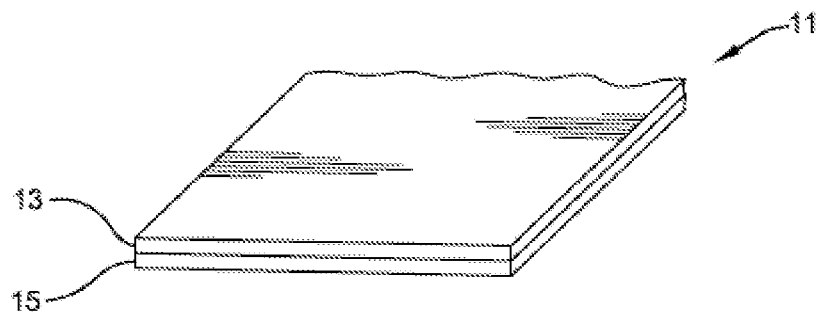
FIG. 1 is a perspective view of a single-extrudate membrane according to embodiments of the present invention.

Membranes according to one or more embodiments of the present invention can be described with reference to FIG. 1. In this embodiment, the membrane includes planar body 11, which also may be referred to as sheet 11 or panel 11. In this embodiment, panel 11 is a planar body that consists of a single extrudate. In one or more embodiments, planar body 11 may be compositionally homogeneous or, in other embodiments, planar body 11 may include one or more compositionally distinct layers 13 and 15. For example, compositionally distinct layers 13 and 15 may be formed through coextrusion techniques, and reference may therefore be made to coextruded layers 13 and 15, or first coextruded layer 13 and second coextruded layer 15. According to aspects of the present invention, body 11 or layers 13 and/or 15 include a functionalized polyolefin copolymer.

Figure 2:
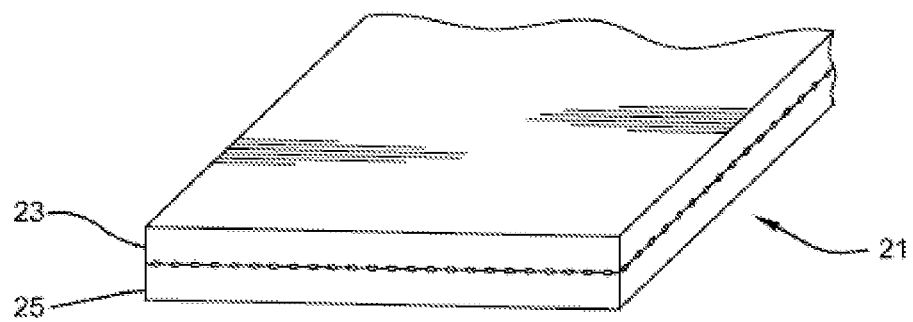
FIG. 2 is a perspective view of a laminate membrane according to embodiments of the present invention.
Figure 3:
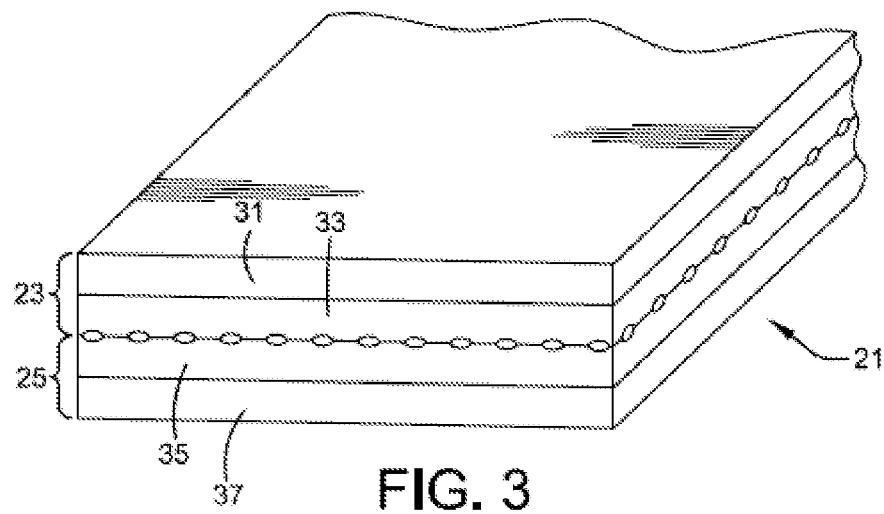
FIG. 3 is a perspective view of laminate membrane according to embodiments of the present invention.

In other embodiments, the membranes of one or more embodiments of the present invention may include two or more laminated layers. For example, as shown in FIG. 2, membrane 21 may include first layer 23 and second layer 25, which are laminated to one another, optionally with a reinforcing scrim 27 disposed between laminated layers 23 and 25. According to aspects of the present invention, at least one of layers 23 and 25 include a functionalized polyolefin copolymer. First layer 23 and second layer 25 may be compositionally similar with respect to one another. Or, in other embodiments, the layers may be compositionally distinct. Additionally, layers 23 and 25 may, within themselves, be compositionally homogeneous or, in other embodiments, they may be nonhomogeneous. For example, either first layer 23, second layer 25, or both layers 23 and 25, may include compositionally distinct coextruded layers. In this respect, U.S. Publ. Nos. 2009/0137168, 2009/0181216, 2009/0269565, 2007/0193167, and 2007/0194482 are incorporated herein by reference. As shown in FIG. 3, first layer 23 may include compositionally distinct coextruded layers 31 and 33, and second layer 25 may include compositionally distinct coextruded layers 35 and 37. According to aspects of the present invention, at least one of coextruded layers 31 and 33 or at least one of coextruded layers 35 and 37 include a functionalized polyolefin copolymer.

As will be discussed in greater detail below, one or more layers of the membranes of this invention include a functionalized polyolefin copolymer. With reference to FIG. 3, these one or more layers may include upper middle layer 33, as well as lower middle layer 35 and bottom layer 37. In these or other embodiments, top layer 31 may also include the functionalized polyolefin copolymer. In certain embodiments, top layer 31 includes a propylene-based polymer that is distinct from a functionalized polyolefin copolymer, such as a propylene-based olefinic polymer as will be described in greater detail below. In these or other embodiments, top layer 31 is devoid of a functionalized polyolefin copolymer. Additionally, in certain embodiments, bottom layer 37 may include a functionalized thermoplastic resin. In one or more embodiments, top layer 31 includes flame retardants and other weathering additives that may provide sufficient environmental protection to the polymers, while at least one of layers 33, 35, and 37 may include fillers such as mineral fillers.

Membrane Characteristics

As discussed above, the membranes employed in the practice of this invention are advantageously characterized by a relatively low stiffness. In one or more embodiments, the low stiffness may be represented by a relatively low flexural modulus, as determined by ASTM D790. For example, the membranes of one or more embodiments of this invention may have a flexural modulus, according to ASTM D790, of less than 90 MPa, in other embodiments less than 80 MPa, in other embodiments less than 70 MPa, in other embodiments less than 60 MPa, in other embodiments less than 50 MPa, in other embodiments less than 40 MPa, and in other embodiments less than 30 MPa. In these or other embodiments, the membranes may be characterized by a flexural modulus of from about 5 to about 90 MPa, in other embodiments from about 10 to about 80 MPa, and in other embodiments from about 20 to about 70 MPa.

In one or more embodiments, the membranes employed in the practice of this invention are advantageously characterized by a relatively Shore hardness (e.g. low Shore A or Shore D). In one or more embodiments, the membranes may be characterized by a Shore D hardness, as determined by ASTM D2240, of less than 40, in other embodiments less than 30, and in other embodiments less than 20. In these or other embodiments, the membranes may be characterized by a hardness of from about 70 Shore A to about 40 Shore D, in other embodiments from about 80 Shore A to about 30 Shore D, and in other embodiments from about 90 Shore A to about 20 Shore D.

In these or other embodiments, the relatively low stiffness of the membranes of this invention may be represented by a relatively low Taber stiffness. As the skilled person appreciates, Taber stiffness is an advantageous measurement for reinforced membrane materials because the measurements can be taken on samples that include a fabric reinforcement. The skilled person understands that these Taber stiffness values can be obtained by employing a Taber stiffness tester, such as a model 510-E Taber V-5 stiffness tester. The skilled person understands that the results of the Taber stiffness test are reported in stiffness units with lower values representing membranes of lower stiffness. In one or more embodiments, the membranes employed in practice of the present invention may be characterized by a Taber stiffness of less than 15, in other embodiments less than 12, in other embodiments less than 8, in other embodiments less than 6, and in other embodiments less than 4. In these or other embodiments, the membranes may be characterized by a stiffness of from about 1 to about 15, in other embodiments from about 2 to about 10, and in other embodiments from about 3 to about 6. In one or more embodiments, the Taber stiffness values of the membranes of the present invention are at least 100%, in other embodiments at least 120%, and in other embodiments at least 150% lower than comparative membranes prepared using similar compositions absent the functionalized polyolefin.

Membrane Composition

In one or more embodiments, the advantageously low flexural modulus is attributable to the polymeric composition of one or more layers of the membrane. Specifically, in one or more embodiments, at least one layer of the multi-layered membranes of the present invention includes a functionalized thermoplastic polyolefin. In these or other embodiments, at least one layer, optionally the at least one layer containing a functionalized polyolefin copolymer, includes a relatively high loading of filler, as described in greater detail below.

Base Polymer

The one or more layers of the thermoplastic membranes of the present invention are prepared from thermoplastic polyolefins (TPO). According to aspects of the present invention, the functionalized polyolefin, and optionally the filler and other constituents, are included within the TPO composition. In one or more embodiments, the TPO forms a matrix in which the functionalized polyolefin copolymer and other constituents of the composition are dispersed. In one or more embodiments, the functionalized polyolefin copolymer and/or other constituents may be co-continuous with the TPO matrix, or in other embodiments, one or more of the constituents (e.g. filler) may exist as discreet phases within the TPO matrix.

Practice of one or more embodiments of the present invention is not limited by the selection of the TPO. In one or more embodiments, the conventional thermoplastic polymer may include an olefinic reactor copolymer, which may also be referred to as in-reactor copolymer. Reactor copolymers are generally known in the art and may include blends of olefinic polymers that result from the polymerization of ethylene and α-olefins (e.g., propylene) with sundry catalyst systems. In one or more embodiments, these blends are made by in-reactor sequential polymerization. Reactor copolymers useful in one or more embodiments include those disclosed in U.S. Pat. No. 6,451,897, which is incorporated therein by reference. Reactor copolymers, which are also referred to as TPO resins, are commercially available under the tradename HIFAX™ (Lyondellbassel); these materials are believed to include in-reactor blends of ethylene-propylene rubber and polypropylene or polypropylene copolymers. Other useful thermoplastic olefins include those available under the treadname TOOG-00(Ineos). In one or more embodiments, the in-reactor copolymers may be physically blended with other polyolefins. For example, in reactor copolymers may be blended with linear low density polyethene.

In one or more embodiments, the thermoplastic polyolefins may include propylene-based elastomer, optionally in combination with a thermoplastic resin. In other words, the polymeric composition of one or more layers may include a propylene-based elastomer. In these or other embodiments, the polymeric composition includes a blend of a propylene-based elastomer and a propylene-based thermoplastic resin. In one or more embodiments, both propylene-based elastomer and the propylene-based thermoplastic resin have isotactic propylene sequences long enough to crystallize. In this regard, U.S. Pat. No. 6,927,258, and U.S. Publ. Nos. 2004/0198912 and 2010/0197844 are incorporated herein by reference.

In one or more embodiments, the propylene-based elastomer is propylene/alpha-olefin copolymer with semi-crystalline isotactic propylene segments. The alpha-olefin content (e.g. polymerized ethylene content) may range from about 5 to about 18%, or in other embodiments from about 10 to about 15%.

In one or more embodiments, the propylene-based elastomer is characterized by a melting point that is less than 110° C. and a heat of fusion of less than 75 J/g.

In one embodiment, the propylene based elastomers have a glass transition temperature (Tg) in the range of about −25 to −35° C. The Tg as used herein is the temperature above which a polymer becomes soft and pliable, and below which it becomes hard and glassy. The propylene-based elastomers may have a MFR range measured at 230° C. of between about 0.5 to about 25, and a melt temperature range of about 50 to 120° C.

In one embodiment, the propylene-based elastomers have a shore A hardness range of about 60 to about 90.

In those embodiments where the propylene-based elastomer is blended with a propylene-based thermoplastic resin, the propylene-based thermoplastic resin may include a crystalline resin. In particular embodiments, the propylene-based thermoplastic resin is characterized by a melting point that is greater than 110° C. and a heat of fusion greater than 75 J/g. In one or more embodiments, the propylene-based thermoplastic resin is stereoregular polypropylene. In one or more embodiments, the weight ratio of the propylene-based elastomer to the thermoplastic resin within the blend may vary in the range of 1:99 to 95:5 by weight and, in particular, in the range 2:98 to 70:30 by weight.

In one embodiment, the propylene-based elastomers have a flexural modulus range of about 500 to about 6000 Psi, or in other embodiments about 1500 to about 5000 psi.

Functionalized Polyolefin Copolymers

In one or more embodiments, the functionalized polyolefin copolymer is a polyolefin copolymer that includes at least one functional group. The functional group, which may also be referred to as a functional substituent or functional moiety, includes a hetero atom. In one or more embodiments, the functional group includes a polar group. Examples of polar groups include hydroxy, carbonyl, ether, ester halide, amine, imine, nitrile, oxirane (e.g., epoxy ring) or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon polymer. In these or other embodiments, the functional group may include an ester group. In specific embodiments, the ester group is a glycidyl group, which is an ester of glycidol and a carboxylic acid. A specific example is a glycidyl methacrylate group.

In one or more embodiments, the polyolefin copolymers to which the functional group is attached (i.e., the backbone of the functionalized polyolefin copolymer) is the copolymerization product of two distinct olefin monomers. In one or more embodiments, the backbone is a copolymer of ethylene and an α-olefin such as, but not limited to, propylene, 1-butene, 1-hexene, 1-octene, 2-methyl-1-propene, 3-methyl-1-pentene, 4-methyl-1-pentene, 5-methyl-1-hexene, and mixtures thereof. In one or more embodiments, these polyolefin copolymers may be referred to as ethylene-based copolymers. In one or more embodiments, the ethylene-based copolymers may include from about 0.1 to about 30, in other embodiments from about 1 to about 20, and in other embodiments from about 2 to about 15 weight percent polymeric units deriving from the copolymerization of α-olefin (i.e., monomer other than ethylene).

In other embodiments, the backbone is a copolymer of propylene and ethylene or another α-olefin such as, but not limited to, 1-butene, 1-hexene, 1-octene, 2-methyl-1-propene, 3-methyl-1-pentene, 4-methyl-1-pentene, 5-methyl-1-hexene, and mixtures thereof. In one or more embodiments, these polyolefin copolymers may be referred to as propylene-based copolymers. In one or more embodiments, the propylene-based copolymers may include from about 0.1 to about 30, in other embodiments from about 1 to about 20, and in other embodiments from about 2 to about 15 weight percent polymeric units deriving from the copolymerization of ethylene or another α-olefin (i.e., monomer other than propylene).

In one or more embodiments, the functionalized polyolefin copolymers include semi-crystalline polymers. In other embodiments, the functionalized polyolefin copolymers include amorphous polymers. In one or more embodiments, the functionalized polyolefin copolymers may be characterized by a crystallinity of less than 20%, in other embodiments less than 10%, in other embodiments less than 5%, and in other embodiments less than 1%. In certain embodiments, the functionalized polyolefin copolymers are amorphous and are therefore characterized by 0% crystallinity. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. In these or other embodiments, the functionalized polyolefin copolymers to be functionalized may be characterized by having a heat of fusion of less than 80 J/g, in other embodiments less than 40 J/g, in other embodiments less than 20 J/g, and in other embodiments less than 10 J/g, in other embodiments less than 5 J/g.

In one or more embodiments, the functionalized polyolefin copolymers may be characterized by a weight average molecular weight ($M_w$) of from about 100 kg/mole to about 2,000 kg/mole, and in other embodiments from about 300 kg/mole to about 600 kg/mole. They may also characterized by a number-average molecular weight ($M_n$) of about 80 kg/mole to about 800 kg/mole, and in other embodiments about 90 kg/mole to about 200 kg/mole. Molecular weight may be determined by size exclusion chromatography (SEC) by using a Waters 150 gel permeation chromatograph equipped with the differential refractive index detector and calibrated using polystyrene standards.

In one or more embodiments, the functionalized polyolefin copolymers may be characterized by a melt flow of from about 0.3 to about 2,000 dg/min, in other embodiments from about 0.5 to about 1,000 dg/min, and in other embodiments from about 1 to about 1,000 dg/min, per ASTM D-1238 at 230° C. and 2.16 kg load. In one or more embodiments, the functionalized polyolefin copolymers may be characterized by a melt flow of less than 15, in other embodiments less than 10, in other embodiments less than 7, in other embodiments less than 5, and in other embodiments less than 4 dg/min, per ASTM D1238 at 230° C. and 2.16 kg load.

In those embodiments where the functionalized polyolefin copolymer has a melt temperature, the melt temperature is less than 30° C., in other embodiments less than 20° C., and in other embodiments less than 5° C. In one or more embodiments, the functionalized polyolefin copolymer is characterized by a glass transition temperature (Tg) of less than 20, in other embodiments less than 0, and in other embodiments less than −10° C. In these or other embodiments, the functionalized polyolefin copolymer has a Tg of from about −50 to about 10, in other embodiments from about −40 to about 0, and in other embodiments from about −30 to about −10° C.

The degree of functionalization of the functionalized thermoplastic polymer may be recited in terms of the weight percent of the pendent functional moiety based on the total weight of the functionalized polyolefin copolymer. In one or more embodiments, the functionalized thermoplastic polymer may include at least 0.2% by weight, in other embodiments at least 0.4% by weight, in other embodiments at least 0.6% by weight, and in other embodiments at least 1.0 weight percent functionalization. In these or other embodiments, the functionalized polyolefin copolymers may include less than 10% by weight, in other embodiments less than 5% by weight, in other embodiments less than 3% by weight, and in other embodiments less than 2% by weight functionalization.

In one or more embodiments, the functionalized thermoplastic polyolefin copolymer may be prepared by grafting a graft monomer to a thermoplastic polyolefin copolymer. The process of grafting may include combining, contacting, or reacting a thermoplastic polymer with a graft monomer. These functionalized polyolefin copolymers include those described in U.S. Pat. Nos. 4,957,968, 5,624,999, 6,503,984, 5,451,639, 4,382,128, 4,161,452, 4,137,185, and 4,089,794, which are incorporated herein by reference. In one or more embodiments, the backbone of the functionalized polyolefin copolymers may be synthesized by using an appropriate polymerization technique known in the art. These techniques may include conventional Ziegler-Natta, type polymerizations, catalysis employing single-site organometallic catalysts including, but not limited to, metallocene catalysts, and high-pressure free radical polymerizations.

Functionalized polyolefin copolymers are commercially available. For example, maleated polyolefin copolymer may be obtained under the tradename EXXELOR VA 1801, 1202, 1803, 1840™ (ExxonMobil).

Filler

In one or more embodiments, one or more layers of the membranes employed in practicing the present invention may include one or more filler materials including, but not limited to, mineral fillers. In one or more embodiments, these fillers may include inorganic materials that may aid in reinforcement, heat aging resistance, green strength performance, and/or flame resistance. In other embodiments, these materials are generally inert with respect to the composition and therefore simply act as diluent to the polymeric constituents. In one or more embodiments, mineral fillers include clays, silicates, titanium dioxide, talc (magnesium silicate), mica (mixtures of sodium and potassium aluminum silicate), alumina trihydrate, antimony trioxide, calcium carbonate, titanium dioxide, silica, magnesium hydroxide, calcium borate ore, and mixtures thereof.

Suitable clays may include airfloated clays, water-washed clays, calcined clays, surface-treated clays, chemically-modified clays, and mixtures thereof.

Suitable silicates may include synthetic amorphous calcium silicates, precipitated, amorphous sodium aluminosilicates, and mixtures thereof.

Suitable silica (silicon dioxide) may include wet-processed, hydrated silicas, crystalline silicas, and amorphous silicas (noncrystalline).

In one or more embodiments, the fillers are not surface modified or surface functionalized.

In one or more embodiments, the mineral fillers are characterized by an average particle size of at least 1 μm, in other embodiments at least 2 μm, in other embodiments at least 3 μm, in other embodiments at least 4 μm, and in other embodiments at least 5 μm. In these or other embodiments, the mineral fillers are characterized by an average particle size of less than 15 μm, in other embodiments less than 12 μm, in other embodiments less than 10 μm, and in other embodiments less than 8 μm. In these or other embodiments, the mineral filler has an average particle size of between 1 and 15 μm, in other embodiments between 3 and 12 μm, and in other embodiments between 6 and 10 μm.

Other Ingredients

One or more layers of the thermoplastic membranes employed in the practice of this invention may also include other ingredients such as those that are conventional in thermoplastic membranes. In one or more embodiments, one or more layers of the membranes employed in this invention may include stabilizers. Stabilizers may include one or more of a UV stabilizer, an antioxidant, and an antiozonant. UV stabilizers include Tinuvin™ 622. Antioxidants include Irganox™ 1010. For example, other useful additives or constituents may include flame retardants, stabilizers, pigments, and fillers.

Flame Retardants

In one or more embodiments, useful flame retardants include and compound that will increase the burn resistivity, particularly flame spread such as tested by UL 94 and/or UL 790, of the laminates of the present invention. Useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™. Those flame retardants from the foregoing list that are believed to operate by forming a char layer include ammonium polyphosphate and melamine polyphosphate.

In one or more embodiments, treated or functionalized magnesium hydroxide may be employed. For example, magnesium oxide treated with or reacted with a carboxylic acid or anhydride may be employed. In one embodiment, the magnesium hydroxide may be treated or reacted with stearic acid. In other embodiments, the magnesium hydroxide may be treated with or reacted with certain silicon-containing compounds. The silicon-containing compounds may include silanes, polysiloxanes including silane reactive groups. In other embodiments, the magnesium hydroxide may be treated with maleic anhydride. Treated magnesium hydroxide is commercially available. For example, Zerogen™ 50.

Examples of halogenated flame retardants may include halogenated organic species or hydrocarbons such as hexabromocyclododecane or N,N'-ethylene-bis-(tetrabromophthalimide). Hexabromocyclododecane is commercially available under the tradename CD-75P™ (ChemTura). N,N'-ethylene-bis-(tetrabromophthalimide) is commercially available under the tradename Saytex™ BT-93 (Albemarle).

In one or more embodiments, one or more layers of the membranes of the present invention may include expandable graphite, which may also be referred to as expandable flake graphite, intumescent flake graphite, or expandable flake. Generally, expandable graphite includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation. Expandable graphite useful in the applications of the present invention are generally known as described in International Publ. No. WO/2014/078760, which is incorporated herein by reference.

Commercially available examples of expandable graphite include HPMS Expandable Graphite (HP Materials Solutions, Inc., Woodland Hills, Calif.) and Expandable Graphite Grades 1721 (Asbury Carbons, Asbury, N.J.). Other commercial grades contemplated as useful in the present invention include 1722, 3393, 3577, 3626, and 1722HT (Asbury Carbons, Asbury, N.J.).

In one or more embodiments, the expandable graphite may be characterized as having a mean or average size in the range from about 30 μm to about 1.5 mm, in other embodiments from about 50 μm to about 1.0 mm, and in other embodiments from about 180 to about 850 μm. In certain embodiments, the expandable graphite may be characterized as having a mean or average size of at least 30 μm, in other embodiments at least 44 μm, in other embodiments at least 180 μm, and in other embodiments at least 300 μm. In one or more embodiments, expandable graphite may be characterized as having a mean or average size of at most 1.5 mm, in other embodiments at most 1.0 mm, in other embodiments at most 850 μm, in other embodiments at most 600 μm, in yet other embodiments at most 500 μm, and in still other embodiments at most 400 μm. Useful expandable graphite includes Graphite Grade #1721 (Asbury Carbons), which has a nominal size of greater than 300 μm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized by an onset temperature ranging from about 100° C. to about 250° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; and may also be referred to as the temperature at which expansion of the graphite starts.

In one or more embodiments, one or more layers of the membranes of the present invention include a nanoclay. Nanoclays include the smectite clays, which may also be referred to as layered silicate minerals. Useful clays are generally known as described in U.S. Pat. No. 6,414,070 and U.S. Pat. Publ. No. 2009/0269565, which are incorporated herein by reference. In one or more embodiments, these clays include exchangeable cations that can be treated with organic swelling agents such as organic ammonium ions, to intercalate the organic molecules between adjacent planar silicate layers, thereby substantially increasing the interlayer spacing. The expansion of the interlayer distance of the layered silicate can facilitate the intercalation of the clay with other materials. The interlayer spacing of the silicates can be further increased by formation of the polymerized monomer chains between the silicate layers. The intercalated silicate platelets act as a nanoscale (sub-micron size) filler for the polymer.

Intercalation of the silicate layers in the clay can take place either by cation exchange or by absorption. For intercalation by absorption, dipolar functional organic molecules such as nitrile, carboxylic acid, hydroxy, and pyrrolidone groups are desirably present on the clay surface. Intercalation by absorption can take place when either acid or non-acid clays are used as the starting material. Cation exchange can take place if an ionic clay containing ions such as, for example, $Na^+$, $K^+$, $Ca^{++}$, $Ba^{++}$, and $Li^+$ is used. Ionic clays can also absorb dipolar organic molecules.

Smectite clays include, for example, montmorillonite, saponite, beidellite, hectorite, and stevensite. In one or more embodiments, the space between silicate layers may be from about 15 to about 40×, and in other embodiments from about 17 to about 36×, as measured by small angle X-ray scattering. Typically, a clay with exchangeable cations such as sodium, calcium and lithium ions may be used. Montmorillonite in the sodium exchanged form is employed in one or more embodiments.

Organic swelling agents that can be used to treat the clay include quaternary ammonium compound, excluding pyridinium ion, such as, for example, poly(propylene glycol)bis(2-aminopropyl ether), poly(vinylpyrrolidone), dodecylamine hydrochloride, octadecylamine hydrochloride, and dodecylpyrrolidone. These treated clays are commercially available. One or more of these swelling agents can be used.

Amounts

Functionalized Polyolefin Copolymer

In one or more embodiments, the one or more layers of the membranes of the present invention that include the functionalized polyolefin copolymer include at least 1 weight percent, in other embodiments at least 2 weight percent, in other embodiments at least 3 weight percent, in other embodiments at least 4 weight percent, and in other embodiments at least 5 weight percent of the functionalized polyolefin copolymer (e.g. hydroxyl-bearing polymer) based on the entire weight of the given layer of the membrane that includes the functionalized polyolefin copolymer. In one or more embodiments, the one or more layers of the membranes of the present invention that include the functionalized polyolefin copolymer include at most 20 weight percent, in other embodiments at most 15 weight percent, and in other embodiments at most 10 weight percent of the functionalized polyolefin copolymer based on the entire weight of the given layer of the membrane that includes the functionalized c polyolefin opolymer. In one or more embodiments, the one or more layers of the membranes of the present invention that include the functionalized polyolefin copolymer include from about 1 to about 20, in other embodiments from about 2 to about 15, and in other embodiments from about 3 to about 10 weight percent of the functionalized polyolefin copolymer based upon the entire weight of the given layer of the membrane that includes the functionalized polyolefin copolymer.

Filler

As suggested above, one or more layers of the membranes of the present invention, particularly those layers that include the functionalized polyolefin copolymer, may include relatively high loadings of filler (e.g. clay or calcium carbonate). Relatively high levels of loading refers to an appreciable amount of filler. In particular embodiments, the one or more layers of the membranes employed in the present invention include at least 2 weight percent, in other embodiments at least 5 weight percent, in other embodiments at least 10 weight percent, in other embodiments at least 15 weight percent, in other embodiments at least 20 weight percent, in other embodiments at least 25 weight percent, in other embodiments at least 30 weight percent, 33 weight percent, in other embodiments at least 40 weight percent, and in other embodiments at least 45 weight percent of the filler (e.g. mineral filler) based on the entire weight of the given layer of the membrane that includes the filler. In one or more embodiments, one or more layers of the membranes of the present invention include at most 80 weight percent, in other embodiments at most 70 weight percent, and in other embodiments at most 60 weight percent of the filler based on the entire weight of the given layer of the membrane that includes the filler. In one or more embodiments, one or more layers of the membranes of the present invention include from about 1 to about 80, in other embodiments from about 33 to about 80, in other embodiments from about 2 to about 75 weight percent, in other embodiments from about 10 to about 70, in other embodiments from about 40 to about 70, in other embodiments from about 20 to about 65, in other embodiments from about 40 to about 60, and in other embodiments from about 45 to about 55 weight percent of the filler based upon the entire weight of the given layer of the membrane that includes the filler.

Flame Retardants

In one or more embodiments, the one or more layers of the membranes of the present invention that include the flame retardant (e.g. magnesium hydroxide) include at least 5 weight percent, in other embodiments at least 10 weight percent, in other embodiments at least 20 weight percent, in other embodiments at least 25 weight percent, and in other embodiments at least 30 weight percent of the flame retardant (e.g. magnesium hydroxide) based on the entire weight of the given layer of the membrane that includes the flame retardant. In one or more embodiments, the one or more layers of the membranes of the present invention that include the flame retardant include at most 50 weight percent, in other embodiments at most 45 weight percent, and in other embodiments at most 40 weight percent of the flame retardant based on the entire weight of the given layer of the membrane that includes the flame retardant. In one or more embodiments, the one or more layers of the membranes of the present invention that include the flame retardant include from about 5 to about 50, in other embodiments from about 10 to about 45, and in other embodiments from about 20 to about 40 weight percent of the flame retardant based upon the entire weight of the given layer of the membrane that includes the flame retardant.

SPECIFIC EMBODIMENTS

Specific embodiments of the membranes employed in the practice of the present invention can be described with reference to FIG. 3. In one or more embodiments, the membranes employed in the present invention may include functionalized polyolefin copolymer in upper-middle layer 33, lower-middle layer 35, optionally top layer 31, and optionally bottom layer 37. In particular embodiments, while upper-middle layer 33 and lower middle layer 35 may include functionalized polyolefin copolymer, top layer 31 may be devoid of functionalized polyolefin copolymer.

In one or more embodiments, bottom layer 37 includes functionalized polyolefin copolymer. In one or more embodiments, bottom layer 37 includes from about 1 to about 10, in other embodiments from about 3 to about 8, and in other embodiments from about 4 to about 6% by weight functionalized polyolefin copolymer, based upon the entire weight of the layer.

In one or more particular embodiments, top layer 31, upper-middle layer 33, lower-middle layer 35, and bottom layer 37 may include distinct amounts of one or more distinct or similar fillers. For example, in one or more embodiments, top layer 31 may include from about 15 to about 50, in other embodiments from about 20 to about 40, and in other embodiments from about 25 to about 35% by weight magnesium hydroxide filler, based on the entire weight of the layer, while upper-middle layer 33, lower-middle layer 35, and bottom layer 37 include less than 20, in other embodiments less than 10, and in other embodiments less than 5% by weight magnesium hydroxide filler, based upon the entire weight of the respective layers.

In one or more particular embodiments, at least one of upper-middle layer 33, lower-middle layer 35, and bottom layer 37 individually include, or in certain embodiments each of layers 33, 35, and 37 include, from about 25 to about 75, in other embodiments from about 35 to about 65, and in other embodiments from about 45 to about 65% by weight calcium carbonate filler, based on the entire weight of the layer. As suggested above, these layers (i.e., layers 33, 35, and 37) each include functionalized polyolefin copolymer.

Fully-Adhered Roofing System

Figure 4:
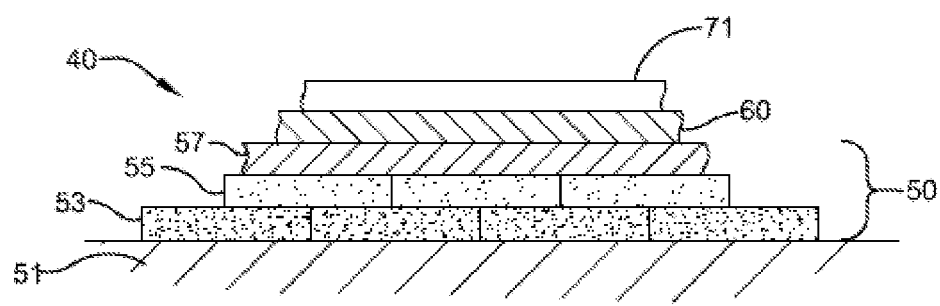
FIG. 4 is a cross-sectional view of a fully-adhered roofing system according to embodiments of the present invention.

The fully-adhered roofing systems of the present invention can be described with reference to FIG. 4. Roofing system 40 includes a roof deck 51, optional insulation layer 53, optional protection layer 55, optional existing membrane 57, adhesive layer 60, and membrane 71, where membrane 71 is a membrane according to one or more embodiments of the present invention. For purposes of this specification, the material to which the adhesive secures the membrane, which is the uppermost layer, can be referred to as the substrate. For example, where the membrane is adhesively secured to an insulation board or layer, the insulation board or layer may be referred to as a substrate.

Practice of this invention is not limited by the selection of any particular roof deck. Accordingly, the roofing systems herein can include a variety of roof decks. Exemplary roof decks include concrete pads, steel decks, wood beams, and foamed concrete decks.

In one or more embodiments, the existing membranes may include cured rubber systems such as EPDM membranes, functionalized polyolefin copolymers systems such as TPO membranes, or asphalt-based systems such as modified asphalt membranes and/or built roof systems.

Practice of this invention is likewise not limited by the selection of any particular insulation board. Moreover, the insulation boards are optional. Several insulation materials can be employed including polyurethane or polyisocyanurate cellular materials. These boards are known as described in U.S. Pat. Nos. 6,117,375, 6,044,604, 5,891,563, 5,573,092, U.S. Publication Nos. 2004/01099832003/0082365, 2003/0153656, 2003/0032351, and 2002/0013379, as well as U.S. Ser. Nos. 10/640,895, 10/925,654, and 10/632,343, which is incorporated herein by reference. As those skilled in the art appreciate, insulation boards and cover boards may carry a variety of facer materials including, but not limited to, paper facers, fiberglass-reinforced paper facers, fiberglass facers, coated fiberglass facers, metal facers such as aluminum facers, and solid facers such as wood.

In one or more embodiments, cover boards may include high density polyurethane or polyisocyanurate board as disclosed in U.S. Publ. Nos. 2006/0127664, 2013/0164524, 2014/0011008, 2013/0036694, and 2012/0167510,25 which are incorporated herein by reference. In other embodiments, the cover boards may include construction boards such as DensDeck.

In other embodiments, these membranes may be employed to cover flat or low-slope roofs following a re-roofing event. In one or more embodiments, the membranes may be employed for re-roofing as described in U.S. Publication No. 2006/0179749, which are incorporated herein by reference.

Practice of the present invention is also not necessarily limited by the adhesive employed to bond the membrane to the substrate. For example, the adhesive may include an adhesive that forms a bond through curing action such as is the case with a liquid bond adhesive (e.g. a butyl rubber adhesive) or a polyurethane adhesive. In other embodiments, the adhesive may be a pressure-sensitive adhesive, which may be applied to the membrane at the location where the membrane is manufactured (e.g. a factory-applied pressure-sensitive adhesive).

As used within the specification, the term "fully-adhered roofing system" refers to a roofing system wherein the primary mode of attachment of the membrane to the underlying substrate is through the use of an adhesive. In one or more embodiments, this mode of attachment includes the situation where at least 50%, in other embodiments at least 70%, in other embodiments at least 90%, and in other embodiments at least 98% of the underlying surface of the membrane (i.e., the substrate-contacting planar surface of the membrane) is adhered to the substrate through an adhesive.

Method of Making

In one or more embodiments, the membranes employed in the present invention may be prepared by employing conventional techniques. For example, the various ingredients can be separately fed into an extruder and extruded into membrane and, optionally, laminated into a laminate sheet. In other embodiments, the various ingredients can be combined and mixed within a mixing apparatus such as an internal mixer and then subsequently fabricated into membrane sheets or laminates.

In one or more embodiments, the membranes of the present invention may be prepared by extruding a polymeric composition into a sheet. Multiple sheets may be extruded and joined to form a laminate. A membrane including a reinforcing layer may be prepared by extruding at least one sheet on and/or below a reinforcement (e.g., a scrim). In other embodiments, the polymeric layer may be prepared as separate sheets, and the sheets may then be calandered with the scrim sandwiched there between to form a laminate. In one or more embodiments, the membranes of the present invention are prepared by employing co-extrusion technology. Useful techniques include those described in co-pending U.S. Ser. Nos. 11/708,898 and 11/708,903, which are incorporated herein by reference.

Following extrusion, and after optionally joining one or more polymeric layers, or optionally joining one or more polymeric layer together with a reinforcement, the membrane may be fabricated to a desired thickness. This may be accomplished by passing the membrane through a set of squeeze rolls positioned at a desired thickness. The membrane may then be allowed to cool and/or rolled for shipment and/or storage.

The polymeric composition that may be extruded to form the polymeric sheet may include the ingredients or constituents described herein. For example, the polymeric composition may include functionalized polyolefin copolymer, filler, and functionalized polyolefin copolymers defined herein. The ingredients may be mixed together by employing conventional polymer mixing equipment and techniques. In one or more embodiments, an extruder may be employed to mix the ingredients. For example, single-screw or twin-screw extruders may be employed.

Various modifications and alterations that do not depart from the scope and spirit of this invention will become apparent to those skilled in the art. This invention is not to be duly limited to the illustrative embodiments set forth herein.

What is claimed is:

1. A roof system comprising:
   i. a roof substrate; and
   ii. a multi-layered thermoplastic membrane including:
      (a) a first layer including first and second coextrudate layers, where the first coextrudate layer includes a thermoplastic polyolefin and from 15 to 50 weight percent magnesium hydroxide based on the entire weight of the first coextrudate layer, and is devoid of a functionalized polyolefin, and where the second coextrudate layer includes a thermoplastic polyolefin, from 33 to 80 weight percent calcium carbonate or clay based on the entire weight of the second coextrudate layer, and from about 1 to about 20 weight percent of a functionalized polyolefin copolymer based upon the entire weight of the second coextrudate layer, and
      (b) a second layer including a thermoplastic polyolefin, from 33 to 80 weight percent calcium carbonate or clay based on the entire weight of the second layer, and from about 1 to about 20 weight percent of a functionalized polyolefin copolymer based upon the entire weight of the second layer, said second layer including a planar surface forming an exterior surface of the multi-layered thermoplastic membrane, where at least 50% of the planar surface of the second layer forming an exterior surface of the thermoplastic membrane is adhered through an adhesive to the roof substrate; and wherein the thermoplastic membrane is characterized, prior to being adhered to the substrate, by a stiffness represented by a flexural modulus of less than 90 MPa, or by a Taber stiffness of less than 15, or by a shore D hardness of less than 40, or by a combination thereof.

2. The roof system of claim 1, wherein the second layer includes from about 2 to about 15 weight percent of the functionalized polyolefin copolymer based upon the entire weight of the second layer.

3. The roof system of claim 1, wherein the second layer includes from about 3 to about 10 weight percent of the functionalized polyolefin copolymer based upon the entire weight of the second layer.

4. The roof system of claim 1, where the first coextrudate layer is devoid of clay.

5. The roof system of claim 1, where the multi-layered thermoplastic membrane is fully adhered to the roof substrate through said adhesive.

* * * * *